United States Patent [19]
Corey et al.

[11] 3,721,879
[45] March 20, 1973

[54] POWER CONTROL FOR PORTABLE ELECTRIC TOOL

[75] Inventors: Lawrence G. Corey, Rockville; John J. Opalenik, New Britain; Robert F. Clough, Bloomfield; all of Conn.

[73] Assignee: Arrow-Hart, Inc., Hartford, Conn.

[22] Filed: July 2, 1965

[21] Appl. No.: 469,218

[52] U.S. Cl. ..................318/345, 310/50, 307/149
[51] Int. Cl. ..............................................H02p 5/12
[58] Field of Search ......307/149, 150, 146; 318/345, 318/341; 338/153, 162, 160, 198; 310/50

[56] References Cited

UNITED STATES PATENTS

| | | | |
|---|---|---|---|
| 3,103,618 | 9/1963 | Slater | 307/146 |
| 1,559,427 | 10/1925 | Hemphill | 338/198 |
| 3,209,228 | 9/1965 | Gawron | 310/50 |
| 3,327,196 | 6/1967 | Sahrbacker | 318/345 |
| 3,329,842 | 7/1967 | Brown | 318/345 |
| 3,292,069 | 12/1966 | Evans | 318/345 |
| 3,225,232 | 12/1965 | Turley et al. | 318/345 X |
| 1,526,368 | 2/1925 | Petersen | 338/131 |
| 3,221,192 | 11/1965 | Franklin | 318/345 |
| 3,319,591 | 5/1967 | Hamlett | 318/345 X |
| 3,280,351 | 10/1966 | Wolter et al. | 310/68 |
| 2,213,078 | 8/1940 | Stoekle | 338/159 |

FOREIGN PATENTS OR APPLICATIONS

| | | | |
|---|---|---|---|
| 883,559 | 5/1960 | Great Britain | 337/162 |

Primary Examiner—G. R. Simmons
Attorney—Davis, Hoxie, Faithfull & Hapgood

[57] ABSTRACT

A trigger operated switch unit for incorporation within the housing of a portable electric motor powered tool has power control and by-pass switches and a rotary potentiometer all controlled and operated by movement of the trigger through cams and through a rack-and-pinion connection between the trigger and the shaft of the potentiometer, to control the speed of the motor via solid state elements and circuitry. The unit has two parallel plates one of which is metal and acts as a heat sink.

12 Claims, 7 Drawing Figures

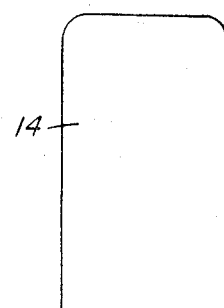
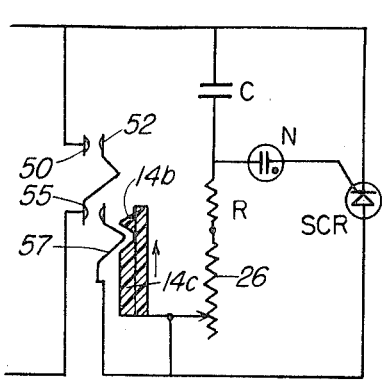
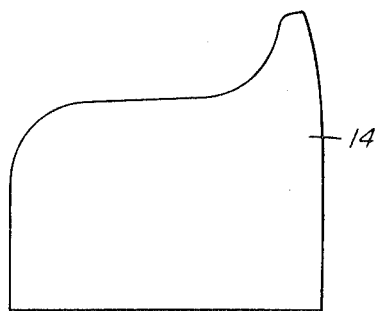
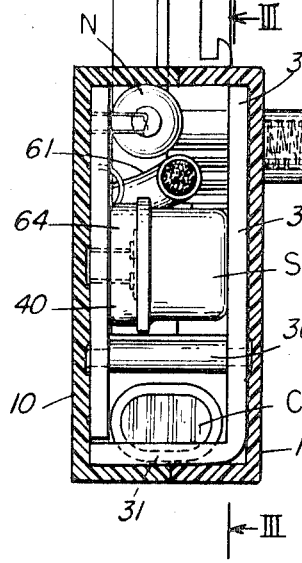
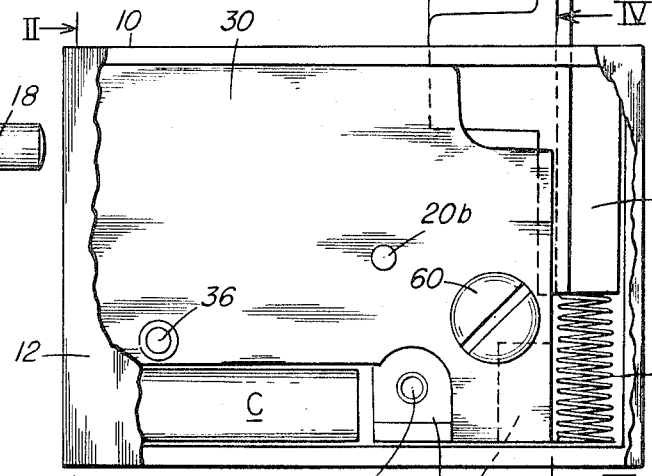
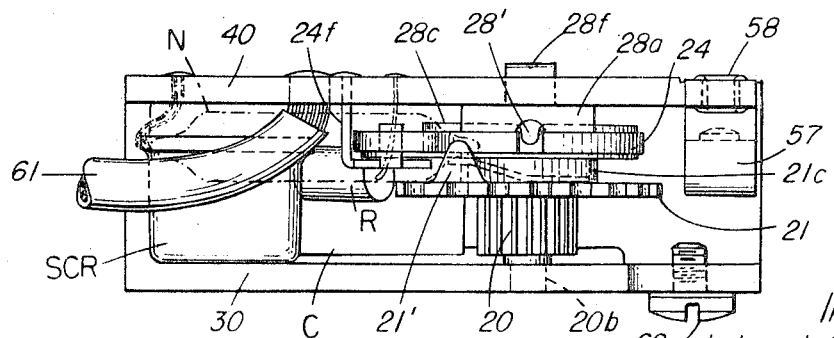

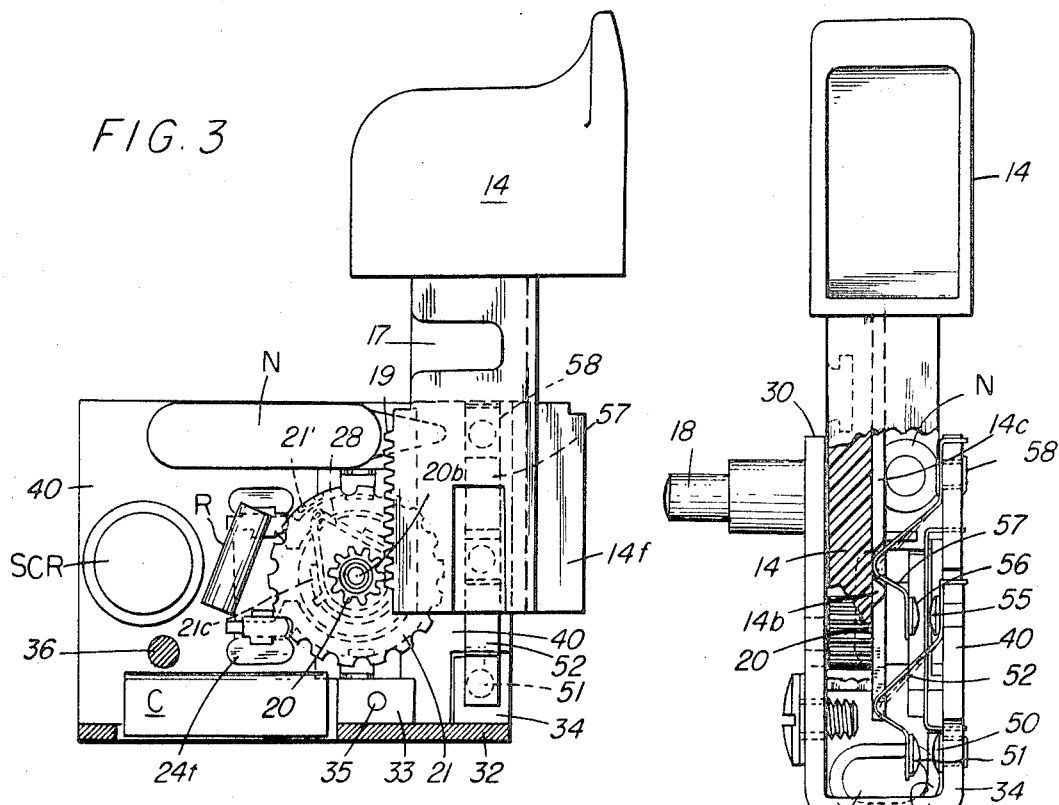
FIG. 3
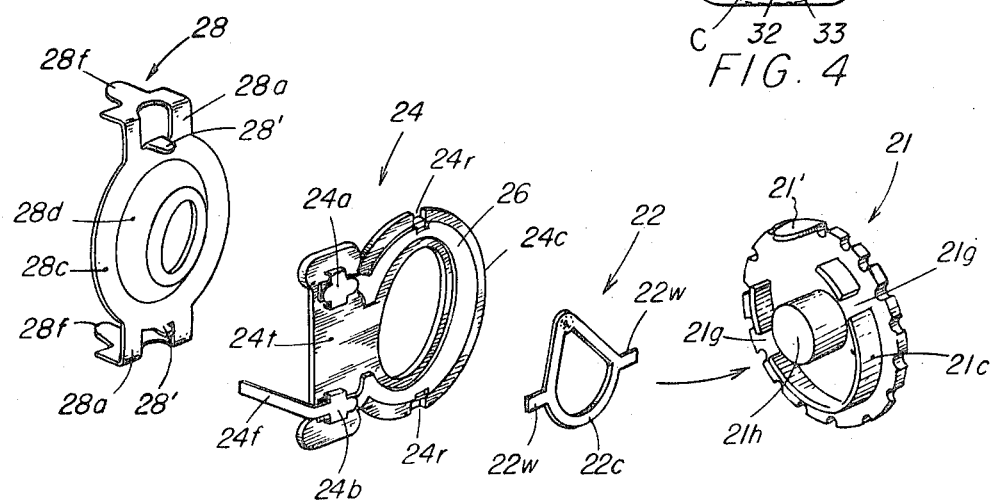
FIG. 4
FIG. 6
Inventors
John J. Opalenik
Lawrence G. Corey
Robert F. Clough
Howson and Howson
BY THEIR ATTORNEYS

POWER CONTROL FOR PORTABLE ELECTRIC TOOL

This invention relates to electric switches. More particularly, it relates to an electric switching device for the control of electric motors and other translating devices by the method commonly known as phase shifting.

Electric switching devices for controlling the delivery of power to, and speed of, electric motors and other translating devices by phase shifting have heretofore been known, but such devices have lacked mechanical precision and ruggedness and the stability necessary, particularly when they are used in connection with portable tools and the like. Such devices commonly include a silicon controlled rectifier (SCR) and other electronic circuit elements which are interconnected in a circuit. Such elements are subject to changes in value or may be damaged when subjected to heating. Therefore, they must be kept below a predetermined temperature when they are assembled and connected and while they are in use. Although it is quite common to use printed circuit plates for the connections between the various elements, it is desirable to keep the soldering to a minimum and also to drain away the heat from the elements during the soldering process.

One of the objects of this invention is to provide a novel mounting for the SCR in the device in a way that will drain away the heat developed during usage and will also tend to keep the device cooler during soldering of the leads of the device to the terminals on the circuit plate.

In devices of the type to which this invention relates, it is desirable to have the device completely disconnected from the power line in the "Off" position of the switch and to have the SCR and electronic circuitry bypassed or short-circuited in the maximum power or full "On" position of the switch.

While means have been provided heretofore for disconnecting the components from the power lines in the "Off" position and for by-passing the SCR in full "On" position, these devices have been relatively cumbersome, of large size and, when used in electric portable tools, they have not been reliable in usage or convenient in operation.

Thus, another object of this invention is to provide an improved means for disconnecting the device from the power lines in "Off" position and for by-passing or short-circuiting the SCR and other electronic elements in full "On" position.

In prior devices, various arrangements of variable resistance units have been provided, but these have been relatively cumbersome or inconvenient or unreliable in usage.

Therefore, another object of the invention is to provide an improved arrangement of parts for controlling by one operating member the operation of the variable resistance or potentiometer unit and for disconnecting the parts in the circuit from the power line in "Off" position and for bypassing or short-circuiting said elements in full "On" position when the operating member of the potentiometer is in one extreme position or the other, respectively.

Another object of the invention is to provide a convenient compact arrangement of parts which will provide a rugged and reliable construction capable of withstanding the rough usage to which the device must necessarily be subjected when used in a portable tool.

Other objects and advantages of the invention will appear as it is described in connection with the accompanying drawings.

In the drawings:

FIG. 1 is a side elevation view, partly broken away, of a device embodying the invention.

FIG. 2 is an end elevational section view of the device of FIG. 1 looking into the left end of FIG. 1 with the section along line II—II.

FIG. 3 is a section view taken along line III—III of FIG. 2 with the casing omitted.

FIG. 4 is an end section view taken along line IV—IV of FIG. 1.

FIG. 5 is a top view of the parts of the device of FIG. 1 with the casing removed and omitting the operating trigger and return spring.

FIG. 6 is an exploded perspective view of the parts of the potentiometer.

FIG. 7 is a diagrammatic illustration of the circuit connections of the parts used in the invention.

Broadly speaking, the invention comprises a combination of small size, compactly arranged, interconnected parts including a condenser, a fixed resistor, a silicon controlled rectifier, a neon tube, and a potentiometer or variable resistance with which is combined switching means for disconnecting these parts from the line in "Off" position or short-circuiting them in full "On" position. A single trigger-type operating member is used for controlling the operation of the potentiometer and also for controlling the switching operations. The parts are compactly arranged and housed within an insulating casing in a manner as will become more fully apparent in the following detailed description of the invention.

Referring to the drawings, the parts are housed within a casing of generally rectangular shape and molded from insulating material. The casing comprises a base section 10 and a cover section 12 fitting upon and cooperating with the base section.

Extending from the casing is an operating member 14 of the trigger type, molded from insulating material. The trigger or finger grip portion of the operating member lies outside the casing while the operating portion extends into the casing and is recessed in one surface semi-cylindrically to receive a coiled compression spring 16 whose upper end presses against the trigger while its lower end presses against the bottom of the casing so as to normally bias the trigger upwardly and outwardly of the casing.

Flanges 14f (only one being visible, in FIGS. 1 and 3) protrude laterally from the trigger and slide in guideways (not visible) formed on the inner side walls of the casing sections, to guide the rectilinear movement of the trigger.

Since it is customary and desirable in trigger-type switches used in operating portable tools to have means to lock the trigger in fully depressed or full "On" position, a recess 17 is molded into the trigger member and is adapted to cooperate with and receive the end of a conventional spring-pressed locking button 18 which, when depressed against the action of its outwardly biasing spring, will engage into the recess 17 and hold the trigger depressed.

On the opposite side of the trigger-operating member from the recess of the biasing spring 16, there is formed a rack of teeth 19 (FIG. 3) which intermesh with the teeth of a pinion 20 of nylon or other suitable insulating material molded integrally with a disc-member 21. The disc member 21 has a scalloped or serrated periphery and forms part of a potentiometer whose parts are illustrated in exploded perspective in FIG. 6.

Broadly speaking, the potentiometer consists of the disc member 21, a rotary wiping contact member 22, a stamped insulation support member 24, a circular or C-shaped resistance element 26, and a stamped sheet metal mounting bracket 28.

The potentiometer and other parts and elements of the device are mounted between a metal plate 30 of generally rectangular shape and a printed circuit insulation plate 40.

The metal plate has a thin finger 31 extending from and perpendicularly bent from one corner (see FIGS. 2 and 3) engaging and supporting the printed circuit plate. Also extending from the metal plate is a bracket portion located at another corner of the same edge as finger 31. The bracket portion is bent perpendicularly to the plate (see FIGS. 4 and 3) and has two spaced neighboring lug portions 33, 34 bent from it perpendicularly and parallel to the plate 30. The lug 34 is at the corner while lug 33 is nearer the center of the edge of the metal plate.

The printed circuit plate 40 is secured to and spaced from the metal plate 30 at one point by the lug 33 and a rivet 35 passing through the lug 33 and through the printed circuit plate 40. The printed circuit plate lies against the outer face of the lug 33 while the lug 34 lies in the plane of the printed circuit plate (see FIG. 4), a corner of the printed circuit plate being cut away to permit this. Also securing the printed circuit plate and the metal plate together in spaced relation at another point is a strut pin 36 (FIGS. 1 and 2) which has reduced ends extending through the plates 30 and 40 and peened over onto said plates. The strut pin 36 is spaced from the securing lug 33 and is near the corner at which the finger 31 is located.

Referring again to the potentiometer, the mounting bracket 28 is stamped from sheet metal with a circular middle portion 28c which is centrally dome-shaped (28d) with a central aperture. From the central portion extend diametrically opposite arms 28d with right angle bends midway of their length. From the end of each arm 28a extends a finger 28f adapted to extend through the printed circuit plate 40 and capable of being bent over to hold the potentiometer on the printed circuit plate. A soldered connection (not shown) on the printed circuit board connects the one finger 28a to the rivet 35 of lug 33 and, hence, to the metal plate 30.

Mounted fixedly on mounting bracket 28 is an insulating support member 24 stamped from sheet insulation in the shape shown in FIG. 6 with a circular central apertured portion 24c and a tangential portion 24t. At diametrically opposite points of the central portion 14c are small recesses 24r adapted to receive miniature lugs 28' which are integral with the mounting bracket 28, being struck up perpendicularly out of the arms 28a in a direction opposite to the fingers 28f. The insulating support member 24 is, thus, fixedly related to the mounting bracket 28.

Mounted flat upon the insulating support plate 24 is a C-shaped ring 26 of flat resistance material, such as carbon or other suitable resistance material. The ends of the resistance element 26 extend outwardly and are secured to tangential portion 24t of the support member by small sheet metal terminal pieces 24a and 24b. The piece 24a merely holds one end of the resistance ring in place while 24b holds the other end in place and has a finger 24f extending through the printed circuit plate and soldered to a lead from the fixed resistor R.

Wiping over the surface of the resistance ring 26 is the apex of the V-shaped contacting portion 22c of the centrally apertured rotary contact 22. This contact is stamped from thin resilient sheet metal into the shape shown in FIG. 6 with the V-shaped portion and two diametrically oppositely extending radial wings 28w. Opposite the V-shaped portion is a circular portion of the same radius as the center of the dome-shaped portion 28d of the mounting bracket 28. When the mounting bracket and insulating support member 24 are assembled together, the dome-shaped central portion 28d extends through the aperture in the insulating support member and the circular portion of the rotary contact rides on the top of the dome 28d, while the V-portion 22c rides on and wipes over the resistance element 26.

Holding the contact 22 rotatably in engagement with the insulating support member 24 and the dome of the mounting bracket 28 is the disc member 21. The disc member 21 is formed of nylon with a stop lug 21' extending from its periphery perpendicular to the plane of the disc. The lug 21c is adapted to engage one end or the other of the tangential portion 24t of the insulating support member 24 as the contact 22 is rotated between its extreme positions.

Inwardly of the periphery of the disc member are segments of a circular collar 21c extending perpendicularly to the plane of a disc concentrically with the disc around a hub 21h. The gaps 21g in the collar are of form and size to receive the wings 28w and the opening in the contact 22 is of size to receive the hub 21h, so that the contact 22 can be fitted against the face of the disc 21 with the circular portion 22c lying within the collar 21c, the wings 28w lying in the gaps and the V-portion extending toward, but not reaching the stop lug 21. The contact 22 is not plane, but is bowed or bent so it exerts a light pressure on the resistance element 26 and the dome 28d while the disc member 21 presses against the central portion or peak of the rotary contact. The hub 21h is deformed by heat and pressure over the contact portion of the dome 28d after extending through the opening therein. This deformation holds all of the elements of the potentiometer in assembled position.

The potentiometer is assembled in the casing between the plates 30 and 40 with an extension or bearing portion 20b (see FIGS. 1 and 5) extending through the metal plate 30. Referring to to FIG. 3 and the foregoing explanation, it may now be understood that upon pressure being applied to the trigger 14, it may be depressed against the action of the biasing spring 16 while the rack 19 engages the pinion 20. This will cause rotation of the disc 21 and rotary contact 22.

In order to by-pass or short-circuit the SCR and other elements when the trigger is fully depressed, a pair of fixed and movable contacts 50, 51, respectively, (FIG. 4) is provided.

The fixed contact 50 is a button mounted on the corner lug 34. The movable contact 51 is mounted on one end of a thin resilient flexible strip of sheet metal 52 bent into V-shape to increase its flexibility. The other end of this strip is secured to the printed circuit plate by a button rivet 55 whose head acts as the fixed contact of another set of fixed and movable contacts 55, 56, respectively. The contact 56 is mounted on one end of another thin strip of resilient flexible sheet metal bent into V-shape whose opposite end is secured to the printed circuit plate by a rivet 58.

The movable contacts are normally biased open.

Operation of the movable contacts is caused by cams 14b and 14c formed on the side of the inner end of trigger 14, still referring to FIG. 4. The cam 14c is a long rib-like formation running lengthwise of the trigger. Its end is adjacent the bend of movable contact 57 when the trigger is in "Off" or outwardly pressed position.

Upon the starting movement of the trigger inward, the movable contact 57 is engaged by cam 14c and is flexed, causing its button 56 to engage the fixed contact 55. This closes the circuit from the power lines to the device causing energization and operation of the motor or other translating device. These contacts 55 and 56 remain closed during the continued inward travel of the trigger as it is further depressed; and they remain closed even after the movable contact button 51 engages contact 50 to apply full power.

Cam 14b is a hump molded on the inner end of the trigger 14. In the outwardly pressed position of the trigger, this cam lies on the opposite side of the bend of the contact 57 from the cam 14c. The distance between the small cam 14b and the bend in the other movable contact 52 is such that when the trigger is fully depressed, the small cam 14b will engage and cause the movable contact 52 to flex and its button 51 to engage the fixed contact 50. This causes by-passing or short-circuiting of all of the elements in the electronic circuit and applies full power to the motor as may be observed by tracing out the circuit in FIG. 7.

Since the circuit connections between the potentiometer, the SCR, the resistor R and the capacitor C are known, and since they are diagrammatically shown in FIG. 7, it will not be necessary to further describe them. It is noted, however, that a terminal screw 60 is threaded into a tapped hole in the metal plate 30 forming one terminal of the device. A pigtail lead wire 61 is soldered to a foil and solder connection on the printed circuit plate connecting with the flexible contact 57. By terminal screw 60 and the pigtail lead 61, the device is connected in series with a motor or other translating device across a.c. power lines. In power tools, food mixers, food blenders and other similar devices, the electric connections are the same as when conventional "On" and "Off" switches are used.

It is important to have the SCR mounted so that heat developed in it during use may be dissipated. For this purpose, a novel mounting is incorporated without the use of solder or screws. The SCR comprises a metal cap or cover inside of which is the rectifier element. The cover forms one terminal of the SCR. Thin lead wires extend from the underside of the cap or cover through holes in the printed circuit plate. The wires are threaded through or pass through a soft elastic washer 64 of rubber or other natural or synthetic resilient plastic material so that the washer lies between the underside of the SCR and the printed circuit plate in assembled position, as best seen in FIG. 2. The elastic washer presses the flat top of the metal cap of the SCR against the inside surface of the metal plate 30. This mounting of the SCR holds it cover firmly in contact with the metal plate 30 and enables heat generated in the SCR to be conducted away to the plate and dissipated. The metal plate, thus, acts as a heat sink for the SCR and protects it and also provides an electric connection to it.

It is noted that the potentiometer contact 22 wipes over the resistance element 24 for an arc of approximately 270°, giving a large variation in resistance incorporated in the circuit. In order to do this with the small amount of travel that the trigger 14 is permitted in portable tools and the like, the ratio teeth in the pinion 20 to the teeth on the rack 19 engageable with the pinion during reciprocation of the trigger must be carefully selected so that the linear travel of the contact 22 will be greater than the linear travel of the trigger. In a device for control of a portable drill, a suitable pinion 20 has ten teeth. The rack has 11 teeth, less than all of which engage the pinion teeth due to the fact that the pinion rotates only about 270°.

The important consideration is that for the limited travel of the rack, the pinion should turn through an angle sufficient to carry the movable potentiometer contact 22 from one end to the other of the resistance element 26. Also, in order that the length of travel of the movable contact over the resistance strip may be greater than the limited travel allowable for the trigger, the movable contact 22 has its point of engagement at a greater radius than the radius of the pinion.

Thus, the invention provides a switching device particularly useful in portable tools, but adapted for food mixers and blenders, and any other motor driven devices or other electronic translating devices. The invention provides a combination of parts which may be compactly arranged for use in a tool handle, and provides a wide variation of resistance when only a small amount of movement is allowable for the operating member or trigger.

At the same time, a large dissipation of heat from the silicon controlled rectifier is provided by means which does not require solder or other connection which might damage the SCR during assembly, but which still provides good heat conductivity by firm and continuous pressure of the SCR housing against the heat sink plate.

Moreover, the operating member or trigger simultaneously controls (a) closing of the power line contacts 55, 57, (b) operation of the potentiometer contact 22, and (c) closing of the by-pass or shorting contacts 50, 52 by a single unitary molded insulation operating member.

Many modifications within the scope of the invention will occur to those skilled in the art. Therefore, the invention is not limited to the specific embodiment described.

What is claimed is:

1. In an electric switching and power control device for portable tools, a casing, a metal plate and an insulation plate within said casing in parallel spaced relation, a rotary member pivotally mounted between said plates, a rotary contact driven by said member, a resistance element engaged by said rotary contact to vary the effective amount of said resistance, an operating trigger member extending within and without said casing for operating said rotary member, a solid-state rectifier element in circuit with said resistance element, a cap covering said rectifier element, resilient means between said plates pressing said cap against said metal plate to conduct away heat from said element.

2. A device as claimed in claim 5 wherein said pressing means comprises a resilient elastic washer.

3. In an electric switching and power control device for portable tools, a casing, a metal plate and an insulation plate with said casing in parallel spaced relation, a potentiometer between said plates including a rotary contact and a circular resistance element, by-pass and power line contacts mounted on said insulating plate, a molded insulation rectilinearly movable trigger member having thereon cam means to operate said power line and by-pass contacts, a solid-state rectifier means between said plates and in circuit with said potentiometer, and means resiliently pressing said rectifier means in engagement with said metal plate to conduct heat from said rectifier means.

4. In an electric switching and power control device for portable tools, a casing, a pair of plates within said casing in parallel spaced relation, a potentiometer between said plates including a rotary contact and a circular resistance element, and a driven pinion to turn said rotary contact, by-pass and power lines contacts mounted on one of said plates, a molded insulation trigger member having a rack portion formed thereon engaging said pinion to rotate the pinion as the operating member is moved and also having thereon cam means to operate said power line and by-pass contacts, a solid-state rectifier means between said plates and in circuit with said potentiometer, and means resiliently pressing said rectifier means in engagement with one of said plates to conduct heat from said rectifier means.

5. A speed control unit for an electrically operated hand manipulated tool, said unit comprising, a casing adapted to be mounted in the housing of said tool, a trigger movably mounted on said casing for oscillating movement, a rotary potentiometer mounted on said casing in adjacent relation with said trigger, one or more components in said casing defining an electrical circuit connected with said potentiometer, which circuit is adapted to control the speed of an associated tool motor, a gear fixed on the rotary element of said potentiometer, a series of gear teeth on said trigger and extending along the direction of movement thereof, which gear teeth are in engagement with said gear and are thereby adapted to rotate said rotary element of the potentiometer upon actuation of said trigger.

6. The speed control unit according to claim 5 wherein said circuit includes a controllable semi-conductor as one component thereof.

7. A speed control unit as claimed in claim 5 wherein said potentiometer has a rotary contact and a resistance element and wherein the teeth on said gear and on said trigger are arranged to cause the linear travel of said rotary contact over said resistance to exceed the linear travel of said trigger so that the motion of the rotary contact is multiplied with respect to the trigger.

8. A speed control unit as claimed in claim 7 having a pair of plates in parallel spaced relation between which the rotary contact of said potentiometer is mounted.

9. A speed control unit as claimed in claim 5 having power line and by-ass contacts, said trigger being of molded insulating material having cam means thereon first closing said power line contacts and later closing said bypass contacts as said potentiometer reaches the end of its rotation.

10. A speed control unit as claimed in claim 9 having a pair of plates in said casing in parallel spaced relation between which the rotary element of said potentiometer is mounted.

11. A variable speed control unit for a hand tool powered by an electric motor, which tool includes a housing having a handgrip portion provided with an opening to receive an operating trigger, said unit comprising, a casing adapted to be mounted in said handgrip housing portion, a trigger mounted on the casing for oscillating movement through said opening, a plurality of electrical components carried by said casing and defining a speed control circuit, and a rotary potentiometer arranged in said circuit so that operation of the former varies the speed of the associated tool motor, said potentiometer being mounted on said casing in adjacent relationship with said trigger, an arcuate gear formation on the rotary element of said potentiometer, a series of gear teeth on said trigger for movement therewith, which teeth are in meshing engagement with said gear formation thereby adapting the trigger for actuation of said potentiometer.

12. The unit according to claim 11 wherein said circuit includes as one component thereof a controllable semi-conductor.

* * * * *